Nov. 26, 1935.  D. J. ALLARDICE  2,021,976

FRUIT STONING MACHINE

Filed Dec. 20, 1934  2 Sheets-Sheet 1

D. J. Allardice
INVENTOR

By Glascock Downing & Seebold
ATTys

Nov. 26, 1935.   D. J. ALLARDICE   2,021,976
FRUIT STONING MACHINE
Filed Dec. 20, 1934   2 Sheets-Sheet 2

D. J. Allardice
INVENTOR

By Glascock Downing & Seebold
Attys.

Patented Nov. 26, 1935

2,021,976

UNITED STATES PATENT OFFICE 2,021,976

FRUIT STONING MACHINE

David John Allardice, Camberwell, London, England, assignor to H. S. Whiteside & Company Limited, London, England Application December 20, 1934, Serial No. 758,494
In Great Britain December 22, 1933

2 Claims. (Cl. 146—17)

This invention relates to stoning fruit and has for its object to provide a method of and a machine for the stoning of dried fruits, particularly dates.

According to the invention, the fruit, while supported on a member provided with a plurality of projections disposed a distance apart less than the width or depth of the stone and projecting above the general surface of the member for a distance as great as or in excess of the width or depth of the stone is subjected to pressure by a member having a yielding surface whereby the flesh of the fruit is pressed into the space between the projections while the stone supported thereby is forced into the yielding surface after which the pressure is released and the stone and the flesh are separately removed.

Preferably, to facilitate the removal of the flesh from between the projections the latter are at suitable times retracted to or below the general surface of the member in which they are provided.

Normally, the pressure member and the member provided with a plurality of projections are moved relatively to one another in such manner that the one or the other constitutes conveying means for bringing the fruit to be treated into positions in which it is subjected to pressure and the stone and the flesh of the fruit thereafter separately removed.

Generally, the member provided with the plurality of projections will be arranged to function as the conveying means. The member in question may be in the form of a band or plate.

Conveniently, however, it is in the form of a cylinder provided with perforations and associated with members carrying pins engaging in the perforations and associated with means whereby the pins may be advanced beyond the general surface of the cylinder and retracted at appropriate times, while the pressure member is in the form of a roller of less diameter than the cylinder and spaced apart therefrom a distance sufficient to enable the flesh of the fruit to be pressed into the spaces between the pins, while the stone is supported on their extremities.

Optionally, a plurality of pressure members may be associated with the cylinder in such manner as to operate successively upon the fruit and with the cylinder there is associated at suitable points means for detaching the stone from the body of the fruit flesh adhering to the cylinder and thereafter removing the flesh from the cylinder.

Preferably, travelling conveyors are also associated with the cylinder for separately delivering stones and the flesh of the fruit.

While the pins may be associated with the cylinder in certain cases in such manner that in the treatment of the fruit the latter is fed on to the exterior surface of the cylinder, it will be found generally desirable to provide for feeding the fruit to be treated on to the inner surface of the cylinder, in which case the pins will be arranged to be moved radially inward in order that the stones will be supported by the ends of the pins while the flesh is pressed down in the intervals between them and, after the stone has been dislodged from the surface of the fruit or the extremities of the pins, to be retracted to permit the removal of the flesh of the fruit from the inner surface of the cylinder.

For removing the flesh of the fruit a simple form of knife scraper may be used.

The removal of the stones, however, is liable to give rise to certain difficulties in that the stones, being somewhat sticky, may accumulate and subject to undesired stresses the means provided for their removal.

To prevent damage due to such stresses, the means for effecting the removal of the stones may be yieldingly or resiliently supported.

Further, as means for removing the stones, an angle member is preferably employed, the angle between the two sides thereof being of the order of 120°.

In a machine in accordance with the invention in which the member provided with a plurality of projections is in the form of a cylinder, the cylinder may be closed at one end, a bearing being provided in the closed end engaging about a spindle suitably supported while the cylinder on its periphery is provided with annular members bearing upon correspondingly formed tracks in a casing within which the cylinder is located.

With a machine comprising a cylinder open at both ends the support for the cylinder may be provided by ball bearings extending about the cylinder and in this case, with the cylinder there may be associated also a circular rack by which it is rotated.

In either of these constructions, in the casing for the cylinder there are located cams adapted to impart appropriate motion to the pins, while the pins themselves may be provided with heads, the stems of the pins passing through the holes in a carrier in the form of a bar, with which is associated a second bar adapted to support the heads of the pins, the two bars being slidably engaged in slots provided in flanges on the cylinder, while the ends of the bars are arranged to co-operate with members functioning as cams provided in the casing.

Generally, the fruit is fed on to the surface of the cylinder at about the plane in which the axis of the cylinder lies, the pressure roller being arranged below the axis in such manner as to press the fruit towards the inner surface of the cylinder.

Where, for instance, two pressure rollers are provided, they will normally be both arranged in the lower half of the cylinder at a convenient distance apart, the cams being so formed that as the fruit passes under one roller the pins will be advanced a distance substantially equal to the depth or width of the stone and when the flesh of the fruit with the stone adhering to the surface thereof passes below the second roller, the pins, as they come under it, are advanced slightly more and are retracted after they have reached the point where the means for detaching the stones is located until at the point where the means for removing the flesh adhering to the cylinder is positioned their ends are somewhat below the inner face thereof.

In the case of a machine designed for stoning dates, which in the case of Basra dates will be found to have stones varying in the neighborhood of one half to three quarters of an inch and one quarter of an inch in diameter, the pins may have a diameter of three thirty-seconds of an inch, the holes in the cylinder through which they pass being seven sixty-fourths of an inch in diameter. The pitch or distance between the centre of the holes in such case will be in the neighborhood of three-sixteenths of an inch, while the cams will be arranged to cause the pins to project one quarter of an inch above the inner surface of the cylinder when fully under the first roller and three eighths of an inch when they are under the second roller, assuming that the machine is provided with two rollers.

The cam is designed to retain the pins in the fully advanced position until the stones are removed from the surface of the fruit, after which retraction of the pins continues until at the point at which the flesh is removed from the cylinder their ends are about one-eighth of an inch below the inner surface of the cylinder.

The invention will be described in detail and by way of example with reference to the accompanying drawings, in which:—

Figure 5 is a fragmentary plan view on a larger scale of the pin carriers, while

Figure 1:
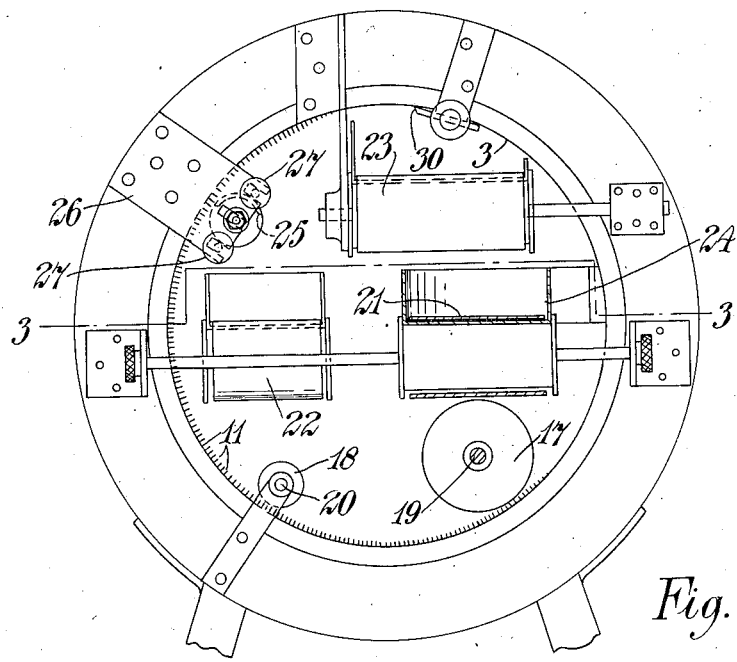
Figure 1 is a view in front elevation of the device.
Figure 2:
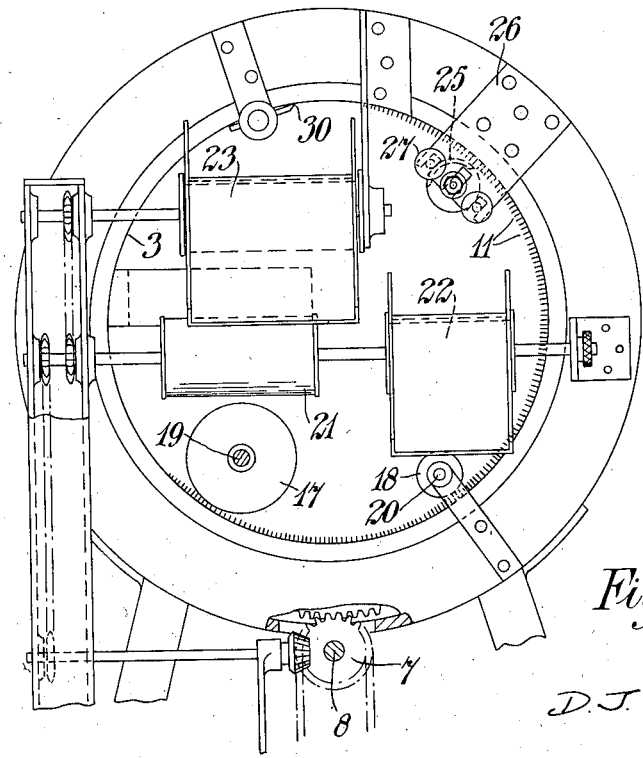
Figure 2 is a view in rear elevation.
Figure 3:
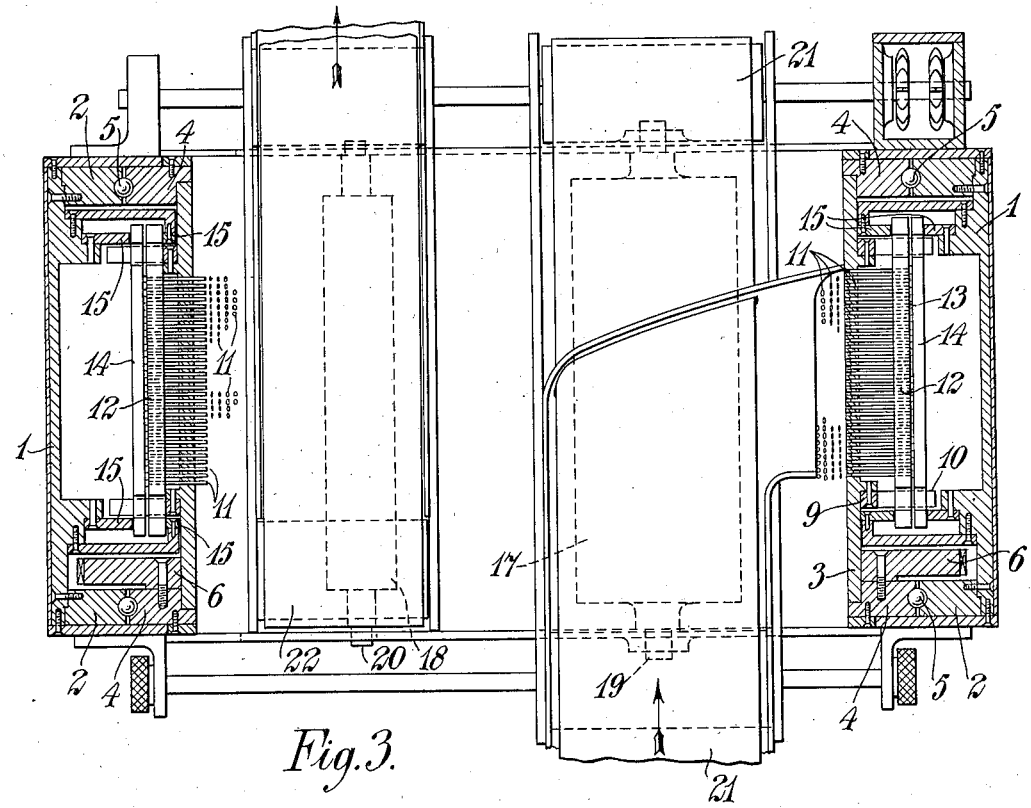
Figure 3 is a sectional plan on the line 3—3 of Figure 1.

Within a casing 1, in which are provided two outer races 2 for ball bearings, a cylinder 3, on the ends of which are provided the inner races 4 of such bearings, is located, balls 5 being provided between the two races, and on the drum also there is provided a toothed ring 6 engaging a pinion 7 on a shaft 8 by which the device is driven.

Figure 4:
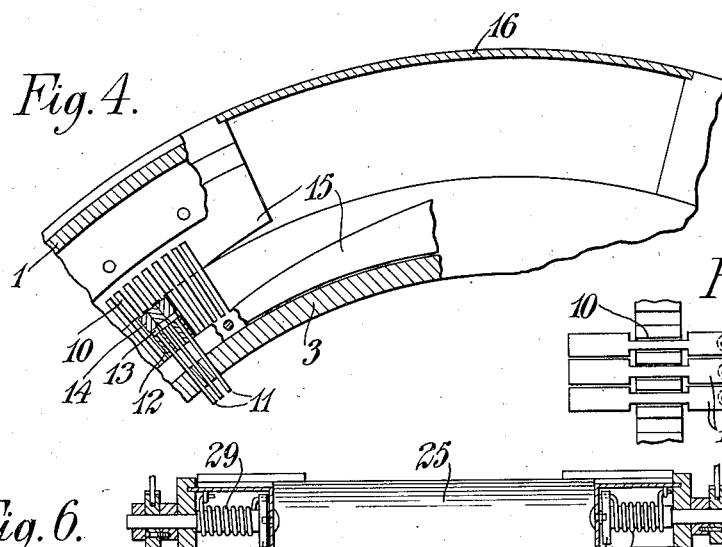
Figure 4 is a fragmentary view on a larger scale showing details of the mounting of the pins and their mode of operation.
Figure 5:
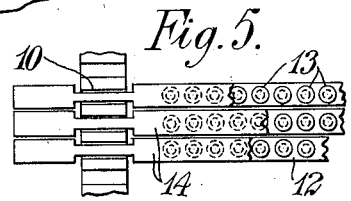

On the cylinder 3 there are provided, further, flanges 9 having radial slots 10 (see Figures 4 and 5) in which are engaged the ends of carriers for the pins 11 each of which carriers comprises a perforated bar 12 through which extend the stems of pins furnished with heads or enlargements 13 engaging against a second unperforated bar 14.

The position in the radial slots of the carriers for the pins and hence also the distance which the pins project above or extend below the inner surface of the cylinder 3 is progressively varied as the cylinder rotates by means of cams 15 extending about or substantially about the periphery of the cylinder.

These cams are arranged to engage both the inner and outer sides of the ends of the carriers so that they and the pins associated with them are positively forced in an inward direction and positively moved in an outward direction at appropriate times.

At the top of the casing there may be provided a cover 16 adapted to be raised in order to render the carriers for the pins accessible for removal and replacement.

Further, within the cylinder 3 there are arranged two relatively hard rubber rollers 17 and 18, the surfaces of which, however, are of a sufficiently yielding character to enable the roller to press the flesh of the fruit into the space between the pins, while the stones supported thereby are displaced and thus forced into the surface of the roller, having spindles 19 and 20 rotatably mounted in bearings provided in the casing and on a plane at or in the neighborhood of the level of the axis of the cylinder there are positioned conveyor bands 21, 22 and 23 adapted, respectively, to feed fruit into the cylinder and to deliver separately therefrom the stones and the flesh.

With the conveyor 21 adapted to feed in the fruit to be treated there is associated a chute 40 adapted to force the fruit off the conveyor band on to the first of the pressure rollers whereby the fruit will be pressed toward the surface of the drum.

Above the conveyor for the removal of the stones adhering to the flesh of the fruit which at this point will be engaged by the pins there is arranged a scraper 25 in the form of a member of semi-circular cross section.

This member is detachably connected with the plate 26 by means of the nuts 27 so that it may be readily removed for cleaning or replacement and with the carrier and the portion of the casing with which it is engaged means is associated to enable the clearance between the edge of one of the sides of the member and the ends of the pins as they pass over the edge in question to be adjusted. The clearance in question may be in the neighborhood of $\frac{1}{32}$ inch to $\frac{1}{16}$ inch.

The member in question not only functions as a knife for removing the stones but also as a deflector for directing the stones on to the conveyor band by which they are delivered to a suitable receptacle.

Figure 6:
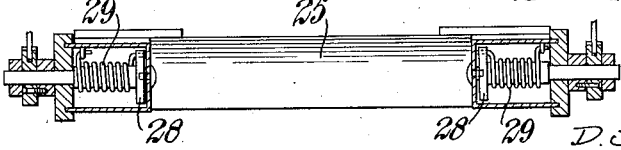
Figure 6 is a view on an enlarged scale of the scraper adapted to effect the delivery of the stones from the machine.

The construction of the member in question is more clearly illustrated in Figure 6 and as will be seen from this figure the scraper in question is secured to end plates 28 with which are associated torsion springs 29 adapted to permit the member to be displaced under excessive stresses.

For removing the flesh of the fruit, as above indicated, a scraper 30, which in effect is a knife blade, is employed, the blade being so arranged as to direct the flesh of the fruit on to the conveyor band 23 serving to deliver it from the machine.

The conveyor band delivering the material to the cylinder and delivering the stones and the flesh therefrom may extend from one side only of the machine or, alternatively, one or more of the conveyors may be arranged to extend into one side of the machine while one or more extend from the opposite side thereof.

What I claim is:—

1. A machine for stoning dried fruits and particularly dates, comprising a member in the form of a cylinder furnished with relatively closely spaced perforations, a plurality of pins entered in said perforations, members engaging the pins and cam elements engaging said members adapted in consequence of rotational movement of the cylinder relative to the cam elements periodically to cause the pins to extend beyond the general level of the inner surface of the cylinder and to be retracted to the general level thereof, a pressure member in the form of a roller of less diameter than the cylinder and spaced apart from its inner surface a distance sufficient to enable the flesh of the fruit to be pressed into the spaces between the pins when extended beyond the general level of the inner surface of the cylinder, leaving the stones supported on their extremities, a scraper device for engaging the stones while supported on the extremities of the pins adapted to cause the stones to be discharged from the cylinder and a further scraper device adapted on the retraction of the pins to remove the flesh of the fruit from the surface of the cylinder.

2. A machine for stoning fruits, particularly dates, comprising a member in the form of a cylinder furnished with relatively closely spaced perforations, radially slotted flanges on the cylinder, in each of the slots a perforated bar, headed pins engaged in the perforations in the bar and adapted to extend through corresponding perforations in the cylinder, a further bar engaged in the slot forming an abutment for the heads of the pins engaged in the perforated bar, cams extending substantially about the periphery of the cylinder adjacent to each of its opposite ends and co-operating with the ends of the bars, bearing members adapted to support the cylinder and permit its rotation, driving mechanism for rotating the cylinder relatively to the cams whereby the bars and the pins associated with them are positively moved at appropriate times in an inward direction and in an outward direction, two rollers within the cylinder and positioned adjacent to the inner surface thereof at points where the pins will be caused to project beyond the inner surface of the cylinder adapted to force the fruit against said pins, a band conveyor adapted to deliver fruit into the interior of the cylinder in advance of one of the rollers, a further band conveyor extending through the cylinder, a scraper device extending above said conveyor and within the cylinder adapted to cause the stones to be discharged on to the conveyor, a third band conveyor and a further scraper co-operating with the inner surface of the cylinder adapted to strip the flesh of the fruit therefrom at a position where the pins are retracted to the general level of the surface of the cylinder.

DAVID JOHN ALLARDICE.